United States Patent
Ooi et al.

(10) Patent No.: US 6,443,393 B1
(45) Date of Patent: Sep. 3, 2002

(54) AIR HEATER OR DRYER APPARATUS, FOR USE ON AIRCRAFT

(75) Inventors: Kean Khoon Ooi, Yorba Linda; Frank V. Parkinson, Anaheim, both of CA (US)

(73) Assignee: Able Corporation, Yorba Linda, CA (US)

( * ) Notice: Subject to any disclaimer, the term of this patent is extended or adjusted under 35 U.S.C. 154(b) by 0 days.

(21) Appl. No.: 09/782,456

(22) Filed: Feb. 12, 2001

(51) Int. Cl.[7] .............................................. B64D 13/00
(52) U.S. Cl. .................................... 244/118.5; 244/1 R
(58) Field of Search ............................. 244/1 R, 118.5; 392/380, 384, 363, 367

(56) References Cited

U.S. PATENT DOCUMENTS

| | | | | |
|---|---|---|---|---|
| 1,466,093 A | * | 8/1923 | Erb | 237/1 R |
| 5,025,130 A | * | 6/1991 | Slone | 219/203 |
| 5,640,781 A | * | 6/1997 | Carson | 34/97 |
| 5,844,202 A | * | 12/1998 | Alverson | 219/203 |
| 5,944,284 A | * | 8/1999 | Bardel | 244/118.5 |
| 6,079,669 A | * | 6/2000 | Hanay et al. | 244/118.5 |

* cited by examiner

Primary Examiner—Peter M. Poon
Assistant Examiner—Timothy D. Collins
(74) Attorney, Agent, or Firm—William W. Haefliger

(57) ABSTRACT

Heater or dryer apparatus to be installed to aircraft fixed structure, comprising in combination, a heater and blower unit to be attached to the fixed structure, an elongated flexible hose extending away from the unit, and configured to receive a flow of heated air from the unit, a nozzle at a distal end of the hose to direct heated air at a person using the apparatus, and a retainer for releasably retaining the hose proximate fixed structure at a location remote from the heater and blower unit.

13 Claims, 6 Drawing Sheets

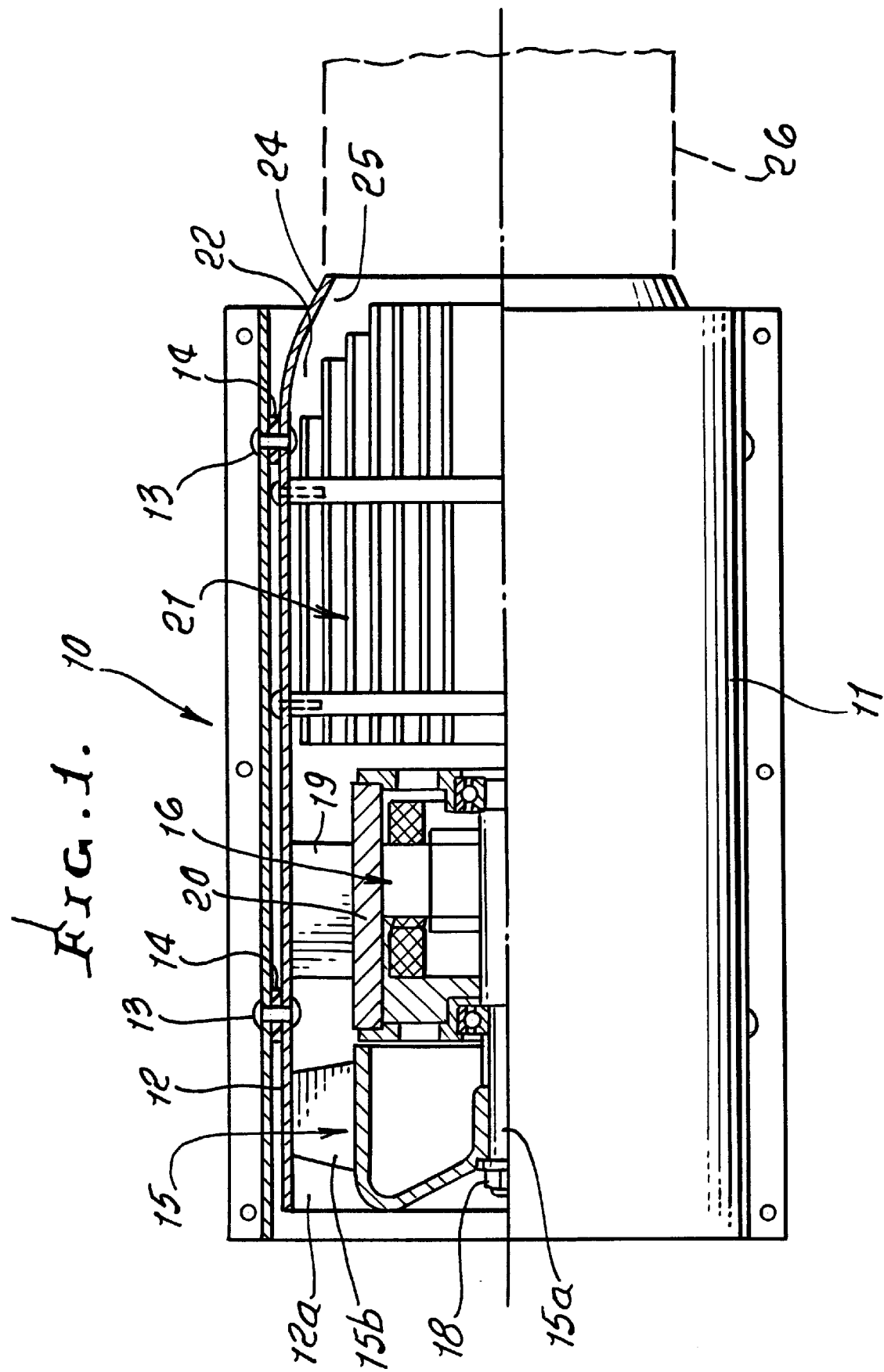

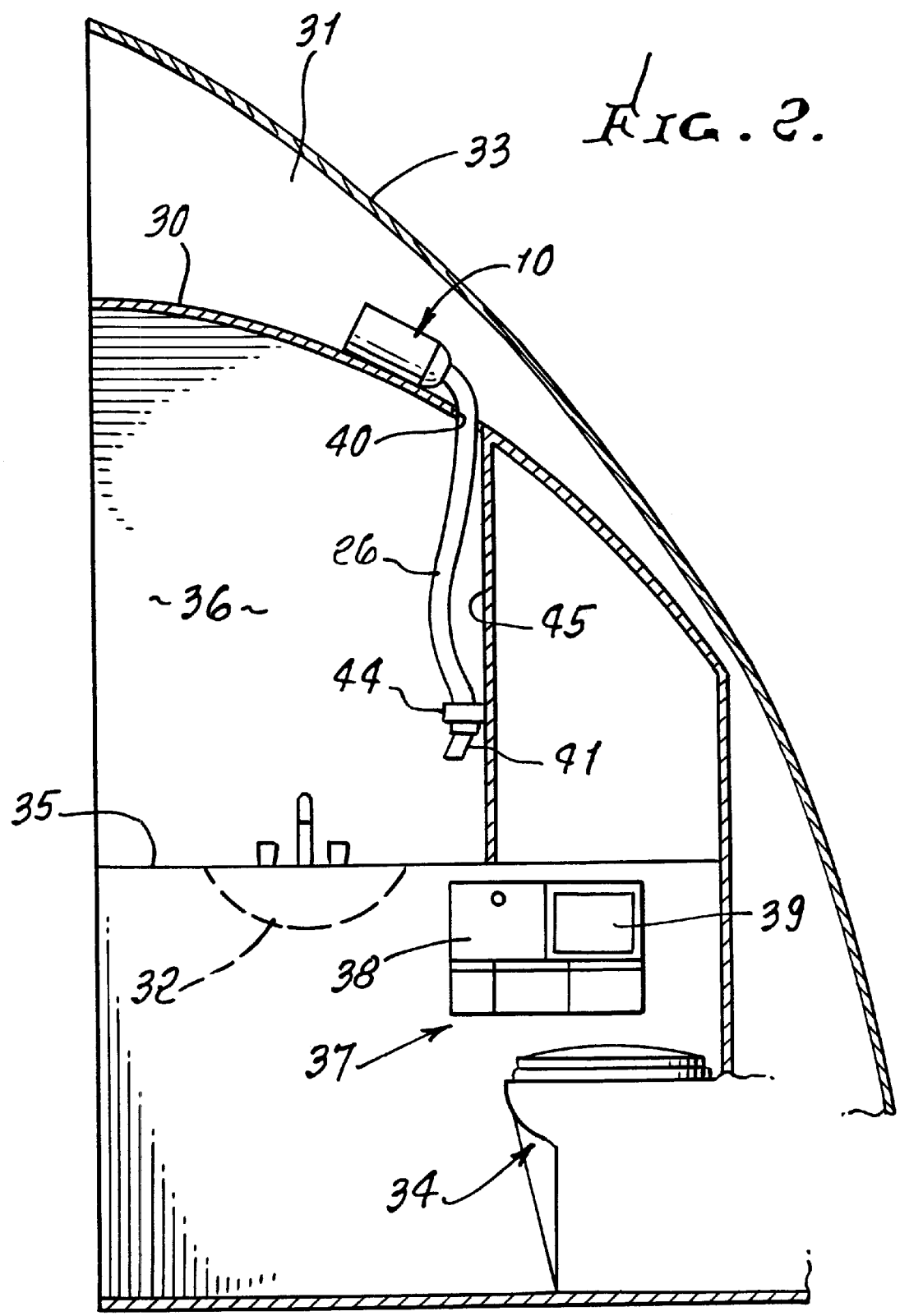

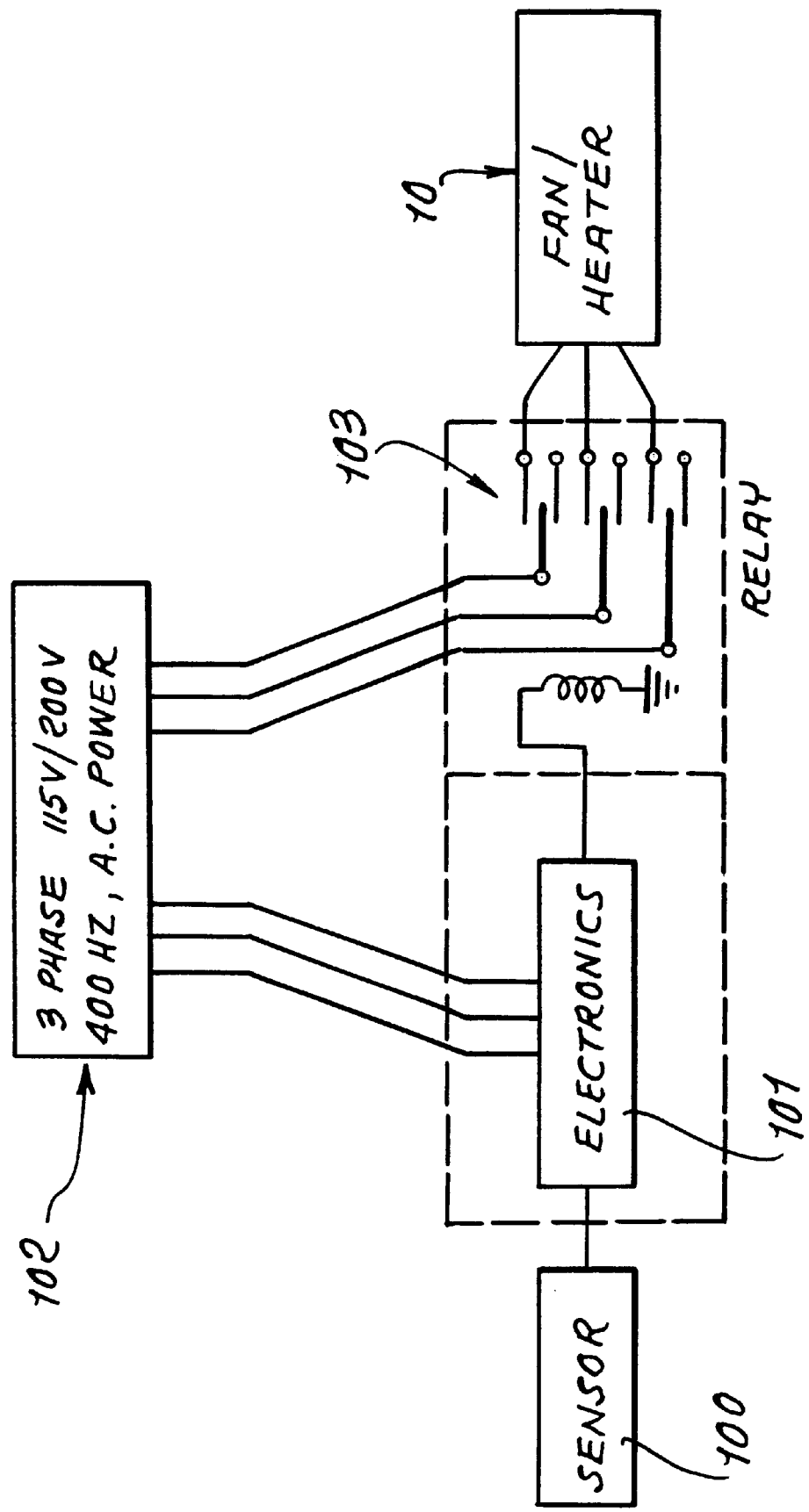

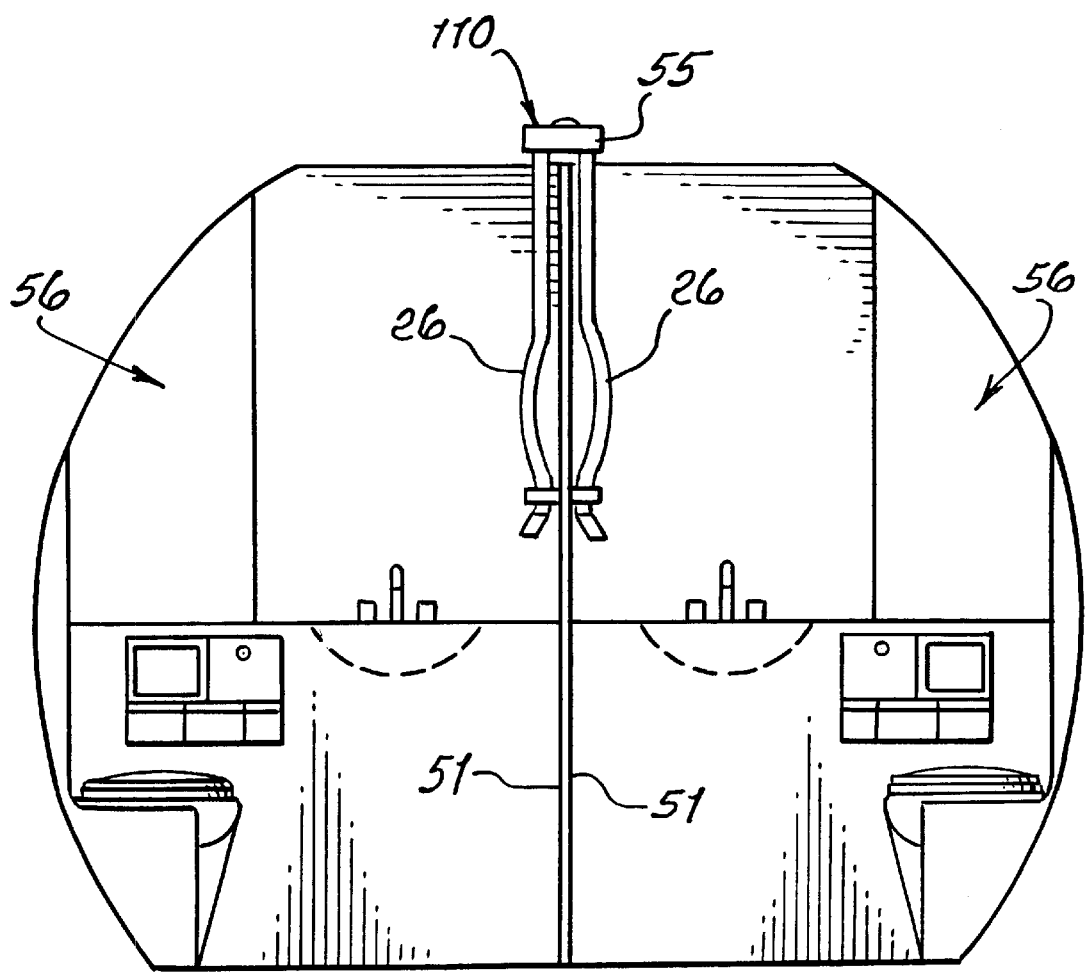

AIR HEATER OR DRYER APPARATUS, FOR USE ON AIRCRAFT

BACKGROUND OF THE INVENTION

This invention relates generally to supply of warm air to passengers on aircraft, and more particularly concerns an improved apparatus to be installed in aircraft and having an elongated flexible warm air delivery hose extending from an air heating unit, the hose manipulable to deliver air throughout a wide range of nozzle positions.

There is need for apparatus, as referred to, as for example in aircraft lavatories, to be used as in hand and or hair drying.

SUMMARY OF THE INVENTION

It is a major object of the invention to provide apparatus, as referred to, to be installed to fixed structure in an aircraft, as for example a panel in an aircraft lavatory, or a panel associated with an aircraft seat, or seats. Basically, the needed and improved apparatus comprises:

a) a heater and blower unit to be attached to said aircraft fixed structure, b) an elongated flexible hose extending from said unit, and configured to receive a flow of heated air from said unit, c) a nozzle at a distal end of said hose to direct heated air at a person using said apparatus, d) and a retainer for releasably retaining the hose proximate fixed structure at a location remote from the heater and blower unit.

It is another object of the invention to provide apparatus which can be easily installed to or in association with a panel at or near the top of an aircraft lavatory compartment, so that the downwardly extending hose is immediately useful, throughout the lavatory compartment. As will be seen, a proximity sensor may be installed at or near the nozzle, and operatively connected to the unit to effect activation of the unit in response to release of the nozzle from the retainer.

A further object is to provide apparatus which can be easily installed to or in association with a panel located at an aircraft seat assembly, as for example beneath a seat part such as an arm rest. In that configuration, the air heater and blower unit can be located beneath the panel, so that the hose may extend remotely and upwardly, for example.

Yet another object is to provide multiple of such panels on or associated with aircraft seat assemblies, together with multiple of the heater/blower units, hoses and nozzles, enabling warm air delivery to multiple seated passengers. In this regard, a single heater/blower unit can be employed to supply warm air to multiple hoses positioned for passenger use.

These and other object and advantages of the invention, as well as the details of an illustrative embodiment, will be more fully understood form the following specification and drawings, in which:

DRAWING DESCRIPTION

FIG. 1 is an elevation partly broken away to show interior construction of a heater/blower unit to be employed;

FIG. 2 is a vertical section taken through an aircraft lavatory compartment, to show installation of a heater/blower unit to an upper panel, with an air delivery hose extending downwardly to a nozzle;

FIG. 2a is a circuit diagram; and

FIG. 3 is a vertical section taken through two adjacent lavatory compartments in an aircraft, and showing supply of warm air from a single heater/blower unit to two hoses respectively in the two compartments.

DETAILED DESCRIPTION

Figure 4:
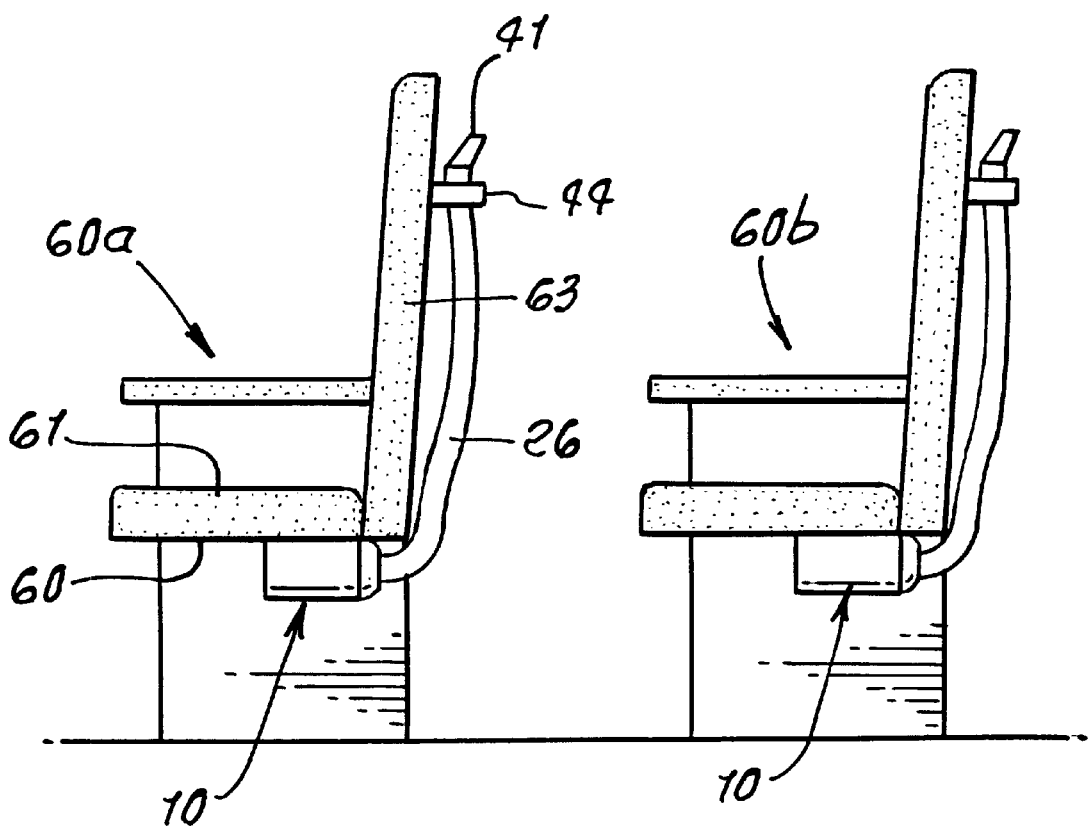
FIG. 4 is a vertical elevation showing installation of a heater/blower unit to an aircraft passenger seat assembly, with an air delivery hose extending upwardly adjacent a seat back.

In FIG. 1, the highly compact heater and blower unit 10 includes a cylindrical casing 11 carrying a tubular duct 12. Fasteners 13 and vibration absorbing spacers 14 extend between 11 and 12. A rotary impeller 15 is located at the air flow entrance end 12a of the duct, and an electrical motor 16 is located downstream of the impeller, and is connected at 18 with the impeller shaft 15a to drive the impeller. Air is displaced by the impeller blades 15b to pass in cooling relation with annularly spaced mounting vanes 19 extending radially from the motor casing 20 to the duct 12.

Air flow passes to the right, into contact with the electrical resistance heating elements 21 extending axially as shown, whereby the air is heated to controlled comfortable temperature. For safety reasons, no surface temperatures, including the surfaces of the heater elements, exceed 300° F. The components of unit 10 are designed and configured to protect against over/under voltage, over-current, and over-temperature conditions. Heated air flow passes to the rightward, discharge end 22 of the unit, and a convergently tapering baffle 24 reduces the flow area at 25, thereby increasing the flow velocity, for flow in a hose 26.

Referring now to FIG. 2, unit 10 is shown as installed above an aircraft lavatory interior upper panel 30, located in the space 31 between the ceiling panel 30 and the aircraft fuselage wall 33. The lavatory interior may include a sink 32, toilet 34, shelf 35, wall 36, and service components 37, such as towels supplied at 38, disposal bin 39, etc.

An elongated flexible hose 26 extends or hangs downwardly from the discharge end of the unit 10, entering the interior of the lavatory via a small aperture 40 in panel 30. The hose may include a nozzle 41 provided at or proximate a lower end of the hose, for manual manipulation to direct heated air at a passenger holding the nozzle. Hose 26 may also be resiliently stretchable to thereby allow nozzle 41 to be positioned to or into a wide area of the lavatory interior, for various drying or heating uses by an interior, for various drying or heating uses by an occupant. For example, a three foot flexible hose can be resiliently stretchable over 100%, i.e. to over 6 feet length.

A retainer is provided for releasably retaining the hose proximate fixed structure at a location remote from said heater and blower unit. See for example retainer 44 attached to lavatory fixed wall 45, for retaining the nozzle 41 to that wall, with the hose 26 retained in substantially vertical position, above the nozzle. Retainer 44 may take the form of a C-shaped clip, or other retaining shape. When nozzle 41 is manually released from the clip, a proximity sensor 100 such as a control switch activates the flow of electrical current flow to unit 10 and via circuitry 101 and 102 and relay 103. See FIG. 2a circuit.

FIG. 3 shows two aircraft lavatory structures or components 56, each like the structure shown in FIG. 2, the two structures extending adjacent one another, as shown. See adjacent walls 51, separating the two lavatory interiors. Hoses 26 extend downwardly within each compartment, as previously described.

The heater/blower unit 110, like unit 10, supplies heated air to each of the hoses, as via a dual outlet manifold 55 associated with the flow discharge end of the duct 12 in unit 100. Valving in the manifold controls flow to the hose 26 to be supplied with warm air; for example the valve to hose entrance end may be opened, as by a solenoid actuator, when the nozzle of that hose is released from its retainer. Accordingly, the unit 110 serves two hoses, singly or simultaneously, in separate lavatories.

FIG. 4 shows attachment of the unit 10 to a panel 60 associated with an aircraft seat assembly 60*a*. That panel faces downwardly, and the unit 10 located beneath that panel. For example, panel 60 may be located at the under side of the aircraft seat 61, with the discharge end of unit 10 directed rearwardly. Hose 26 is shown extending rearwardly and then upwardly at the rear side of the seat back 63, and the retainer 44 is attached to the back, and retains the nozzle 41 as shown, so that upon freeing of the nozzle from the retainer the hose can be manipulated, directed, and/or stretched, to direct warm air at a passenger seated at seat assembly 60*b*, rearwardly of forward seat back 63.

Figure 5:
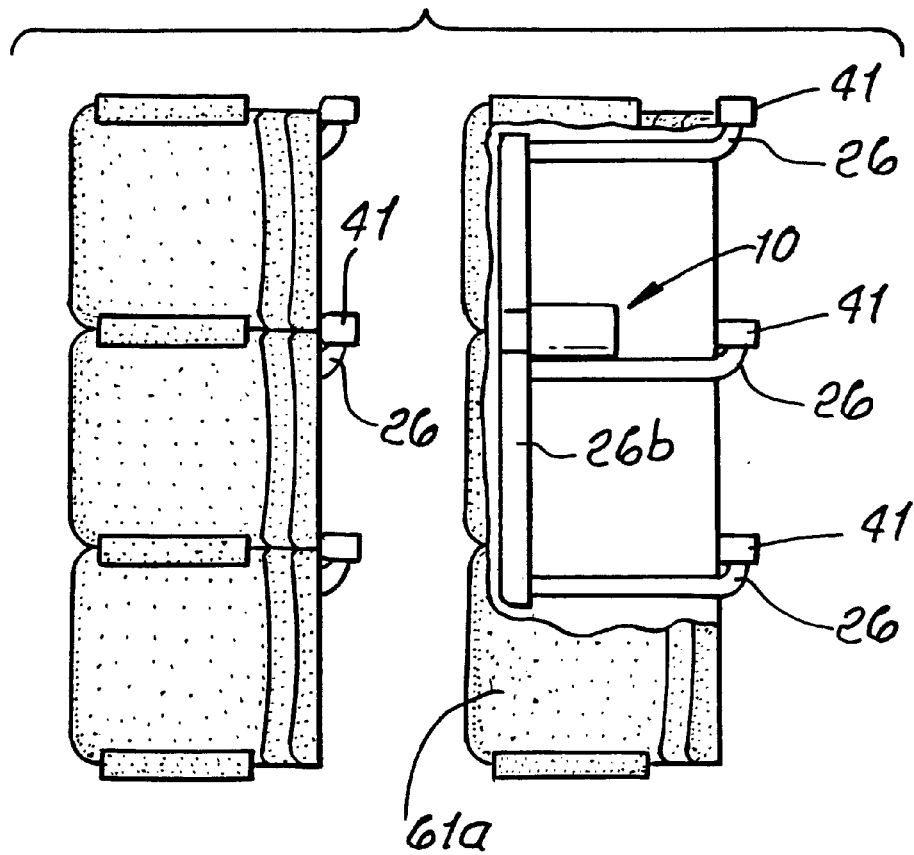
FIG. 5 is a top plan view showing a single heater/blower unit configured to supply warm air to multiple hoses associated with multiple aircraft seats.
Figure 6:
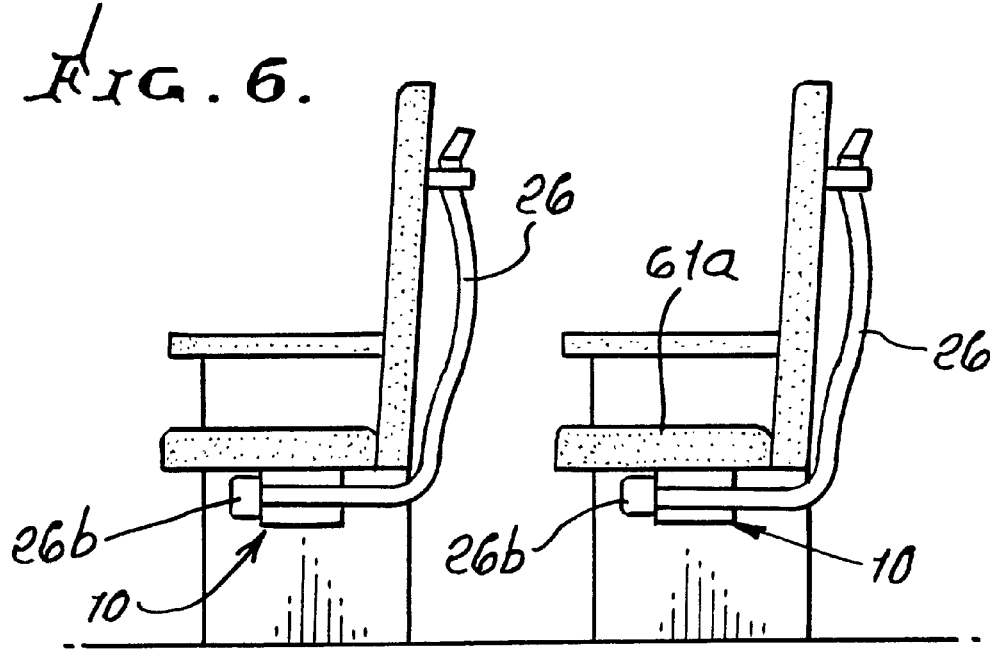
FIG. 6 is a view like FIG. 5, but showing the structure in elevation.

FIG. 6 is like FIG. 4 but showing a single unit 10 for supplying heated air flow to multiple hoses 26 extending upwardly from manifolds 26*b* (supplied with heated air from unit 10) to multiple nozzles 41. See also FIG. 5.

In this embodiment, the unit 10 discharges air forwardly to the manifold that extends laterally beneath the seats, 61*a* in a row. The hoses 26 connect to that manifold. Hoses and nozzles thereby provide air to the passengers in the next rearward seats, and one unit 10 is enabled to supply air to the multiple nozzles. Valving may be provided, as in FIG. 3, to selectively control air flow to a selected hose, when its nozzle is released from its retainer.

We claim:

1. Heater or dryer apparatus to be installed to aircraft fixed structure, comprising in combination:
   a) a heater and blower unit to be attached to said fixed structure,
   b) an elongated flexible hose extending away from said unit, and configured to receive a flow of heated air from said unit,
   c) a nozzle at a distal end of said hose to direct heated air at a person using the apparatus,
   d) and a retainer for releasably retaining the hose proximate fixed structure at a location remote from said heater and blower unit,
   e) and including a proximity sensor carried at or near the nozzle and operatively connected to said unit effecting activation of said unit when the nozzle is released from the retainer.

2. The application of claim 1 wherein said fixed structure includes an aircraft panel.

3. The combination of claim 2 including a first lavatory compartment for an aircraft, and said panel and hose being inside said compartment.

4. The combination of claim 3 wherein said panel is located at or near the top of said compartment so that said hose extends downwardly to the level of a person using said compartment, said hose being resiliently stretchable to substantial extent.

5. The combination of claim 4 including a second lavatory compartment adjacent said first compartment, there being a second flexible hose in the second compartment supplied with heated air from said heater and blower unit.

6. Heater or dryer apparatus to be installed to aircraft fixed structure, comprising in combination:
   a) a heater and blower unit to be attached to said fixed structure,
   b) an elongated flexible hose extending away from said unit, and configured to receive a flow of heated air from said unit,
   c) a nozzle at a distal end of said hose to direct heated air at a person using the apparatus,
   d) and a retainer for releasably retaining the hose proximate fixed structure at a location remote from said heater and blower unit,
   e) and including a proximity sensor carried at or near the nozzle, and connected to said unit to effect activation of said unit in response to release of the nozzle from the retainer.

7. The combination of claim 2 wherein said panel is on or associated with an aircraft seat assembly.

8. The combination of claim 7 wherein said panel faces downwardly, and said unit is located beneath the panel.

9. The combination of claim 7 including multiple of said panels on or associated with multiple aircraft seat assemblies, and multiple of said units, hoses and nozzles, the units associated with the respective panels.

10. The combination of claim 7 including multiple of said hoses and nozzles respectively associated with multiple aircraft seat assemblies, said unit operatively connected with the hoses to supply heated air flow thereto.

11. The combination of claim 10 including a heated air distribution duct connected between said unit and said hoses.

12. The combination of claim 1 wherein said unit comprises:
   i) a casing,
   ii) an open ended duct supported within the case,
   iii) a blower and motor drive for the blower carried within the duct, whereby blower rotation drives air to flow through the duct,
   iv) and an air heater in the duct for heating air flowing through the duct,
   v) said hose having an inlet receiving heated air flow form the duct.

13. The combination of claim 12 including a convergent baffle through which heated air flows to the hose inlet, and at increasing velocity.

\* \* \* \* \*